US00RE42446E

(19) United States
(12) Reissued Patent
Kirk et al.

(10) Patent Number: US RE42,446 E
(45) Date of Reissued Patent: Jun. 14, 2011

(54) EMERGENCY ANTI-TORQUE THRUSTER SYSTEM

(76) Inventors: Charles T. Kirk, Smithfield, VA (US); Grover L. Moore, Portsmouth, VA (US); Virginia L. Hodder, legal representative, Portsmouth, VA (US)

(21) Appl. No.: 11/823,054

(22) Filed: Jun. 26, 2007

Related U.S. Patent Documents

Reissue of:
(64) Patent No.: 7,032,860
Issued: Apr. 25, 2006
Appl. No.: 10/982,037
Filed: Nov. 5, 2004

(51) Int. Cl.
*B64C 27/06* (2006.01)
(52) U.S. Cl. ..... 244/17.19; 244/17.15
(58) Field of Classification Search ..... 244/17.15, 244/17.13, 17.21, 17.19, 138 R
See application file for complete search history.

(56) References Cited

U.S. PATENT DOCUMENTS

| | | | | |
|---|---|---|---|---|
| 1,886,327 | A | 11/1932 | Carlson | |
| 2,503,172 | A | 4/1950 | Pullin | |
| 2,518,697 | A | 8/1950 | Lee | |
| 3,059,877 | A | 10/1962 | Lee | |
| 3,134,561 | A | 5/1964 | Clejan | |
| 3,159,360 | A | 12/1964 | Ryan et al. | |
| 3,325,122 | A | 6/1967 | Young, Jr. | |
| 3,807,662 | A | 4/1974 | Velazquez | |
| 4,046,335 | A | 9/1977 | Osberger | |
| 4,130,258 | A | 12/1978 | Fox | |
| 4,200,252 | A | 4/1980 | Logan et al. | |
| 4,648,568 | A | 3/1987 | Phillips | |
| 4,676,457 | A * | 6/1987 | Allen | 244/17.15 |
| 4,948,068 | A | 8/1990 | VanHorn | |
| 5,205,512 | A | 4/1993 | Rumberger | |
| 5,232,183 | A | 8/1993 | Rumberger | |
| 5,240,205 | A | 8/1993 | Allongue | |
| 5,649,678 | A | 7/1997 | Nurick | |
| 6,036,141 | A | 3/2000 | Clay | |
| 6,416,015 | B1 | 7/2002 | Carson | |
| 2002/0125368 | A1 * | 9/2002 | Phelps et al. | 244/17.23 |

FOREIGN PATENT DOCUMENTS

| | | |
|---|---|---|
| EP | 95302639 | 10/1995 |

* cited by examiner

*Primary Examiner* — Timothy D Collins
(74) *Attorney, Agent, or Firm* — Kimberly A. Chasteen

(57) ABSTRACT

An anti-torque thruster system implemented onboard an aircraft comprising a propulsion means coupled to the aircraft, wherein the propulsion means is capable of providing a measure of anti-torque thrust to the aircraft, a fuel storage container coupled to the propulsion means via a fuel delivery conduit, wherein the fuel storage container is capable of storing an appropriate fuel for the propulsion means, a valve means disposed between the fuel storage container and the propulsion means, wherein the valve means may be useable to regulate the flow of fuel from the fuel storage container to the propulsion means, and a controller for controlling the valve means to regulate the flow of fuel from the fuel storage container to the propulsion means, wherein the controller is capable of receiving input from at least one input device.

27 Claims, 8 Drawing Sheets

EMERGENCY ANTI-TORQUE THRUSTER SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to anti-torque thruster systems. In particular, the present invention relates to an emergency anti-torque thruster system.

2. Description of Related Art

Helicopters and other rotary-wing aircraft are typically lifted and propelled by one or more large horizontal rotors, each comprising multiple, angled or angleable, rotor blades. Helicopters are able to fly because forward motion of the angled rotor blades forces air downwards, creating lift, which forces the rotor blades, and, in turn, the helicopter suspended beneath, upwards.

Useful flight requires that the helicopter's altitude, yaw (movement in the right-left horizontal direction), pitch (tilting forward and back), and roll (tilting sideways) be controlled simultaneously. For yaw control, the pitch, or angle-of-attack, of the helicopter's tail rotor blades is typically varied to alter the amount of thrust produced, thereby altering the right-left horizontal direction of the helicopter. For dual rotor helicopters, a differential between the two rotor transmissions is typically adjusted to transmit differential torque to each rotor and thus turn the helicopter. Yaw controls are usually operated with anti-torque pedals. For pitch or roll control, the angle-of-attack of the main rotor is altered.

The collective pitch control lever, which is typically positioned at the pilot's left side, is a helicopter's primary altitude and power control. The collective is used to vary the lift produced by the main rotor system by increasing or decreasing the pitch, or angle-of-attack, of all the helicopter's main rotor blades simultaneously or collectively throughout the 360-degree plane-of-rotation of the main rotor.

When the collective is raised, the angle-of-attack of the blades is increased, and the main rotor system produces more lift. When the collective is lowered, the angle-of-attack of the blades is decreased, and the main rotor system produces less lift. Increasing the collective and adding power with the throttle cause the helicopter to rise.

The throttle is usually a twist grip mounted at the end of the collective and is used to control the absolute power produced by the engine, which is connected to the rotor by a transmission. On a piston-powered helicopter, the pilot must manipulate the throttle to maintain rotor RPM as the pilot increases and decreases the collective. On a turbine-powered helicopter, a servo-feedback loop between the engine fuel control unit and the governor automatically adjusts the power turbine to maintain rotor RPM as the pilot increases and decreases the collective. Thus, on a turbine-powered helicopter, the pilot normally sets and leaves the throttle at 100 percent power during flight and the servo-feedback loop in the helicopter's engine controls relieves the pilot of routine responsibility for controlling the maintain rotor RPM.

The cyclic controls the pitch of the helicopter's blades cyclically, causing the lift to vary across the plane of the rotor disk. This is how the pilot causes the rotor system to tilt, and the helicopter to move above the ground. In a hover, moving the cyclic forward, for example, makes the helicopter fly forward. Moving the cyclic to the left, for example, makes the helicopter translate, or move over the ground, to the left, and so forth. In flight, the cyclic is the primary airspeed control. Applying forward cyclic causes airspeed to increase. Aft cyclic pressure reduces airspeed. The cyclic is usually controlled by the stick in front of the pilot.

Turning the rotor generates lift but it also applies torque to the body of the helicopter. The torque tends to spin the helicopter in the opposite direction of the rotation of the rotor.

Various methods for counteracting the effects of the torque have been devised. The most common method of counteracting torque is through the use of a smaller, substantially vertical tail rotor mounted at the rear of the helicopter's tail boom. Other methods include the use of a NOTAR® design, wherein air is forced through a long slot along the tail boom, utilizing the coanda effect to produce forces to counter the torque. Another alternative method for counteracting the torque is to utilize two large horizontal rotors that each turn in opposite directions. In this manner, the torque of each rotor counteracts the torque of the other. The anti-torque pedals are used by the pilot to compensate for the torque produced by the main rotor.

SUMMARY OF THE INVENTION

The present invention relates generally to anti-torque thruster systems. In particular, the present invention relates to an emergency anti-torque thruster system.

Unfortunately, while helicopters are powerful and useful aircraft, if the helicopter's main anti-torque system, i.e., the helicopter's tail rotor or second, counteracting rotor fails, the torque from the main rotor will spin the body of the helicopter in the opposite direction of the rotation of the rotor.

The anti-torque thruster system of this invention comprises at least one propulsion means that is capable of at least partially counteracting the torque of the main rotor blades of a helicopter that has experienced partial or total tail rotor malfunction or failure.

In an illustrative, non-limiting embodiment of this invention, the anti-torque thruster system comprises at least one propulsion means coupled to the body of the helicopter that provides anti-torque thrust using either liquid, solid, or gas fuel. In various illustrative, non-limiting embodiments of this invention, the anti-torque thruster system is automatically activated upon tail rotor malfunction or failure. In various illustrative, non-limiting embodiments of this invention, the anti-torque thruster system includes a manual, pilot-activated back-up system. In still other various illustrative, non-limiting embodiments of this invention, the anti-torque thruster system may be operated by the anti-torque pedals.

Accordingly, this invention provides an emergency anti-torque thruster system, which is capable of at least partially counteracting the torque of the main rotor blades of a helicopter that has experienced tail rotor malfunction or failure.

This invention separately provides an emergency anti-torque thruster system, which provides a pilot with a system for providing anti-torque thrust to at least partially counteract the torque of the main rotor blades of a helicopter that has experienced tail rotor malfunction or failure while the pilot locates a landing spot and executes an emergency landing.

This invention separately provides an emergency anti-torque thruster system, which may be coupled to an aircraft during initial manufacturing or may be retrofitted to the aircraft as an after-market product.

These and other features and advantages of this invention are described in or are apparent from the following detailed description of the exemplary embodiments.

BRIEF DESCRIPTION OF THE DRAWINGS

The exemplary embodiments of this invention will be described in detail, with reference to the following figures, wherein like reference numerals refer to like parts throughout the several views, and wherein.

DETAILED DESCRIPTION OF THE PREFERRED EMBODIMENT

For simplicity and clarification, the design factors and operating principles of the anti-torque thruster system according to this invention are explained with reference to various exemplary embodiments of an anti-torque thruster system according to this invention. The basic explanation of the design factors and operating principles of the anti-torque thruster system is applicable for the understanding, design, and operation of the anti-torque thruster system of this invention.

Furthermore, it should be appreciated that, for simplicity and clarification, the embodiments of this invention will be described with reference to the helicopter's main rotor turning left, or counter-clockwise, when viewed from above. The main rotor of helicopters manufactured in the United States typically rotates counter-clockwise. Therefore, if the helicopter's tail rotor fails, the torque from the main rotor will spin the body of the helicopter right, or clockwise, when viewed from above. However, it should be appreciated that certain helicopters, typically helicopters built outside of the United States, have main rotors that turn to the right, or clockwise, when viewed from above, and if one of these helicopter's tail rotor fails, the torque from the main rotor will spin the body of the helicopter left, or counter-clockwise.

Thus, it should be appreciated that the systems, methods, and apparatuses of this invention may be implemented on any helicopter or other known or later developed rotary-wing aircraft, regardless of whether the helicopter's main rotor turns counter-clockwise (as described herein) or clockwise.

It should also be appreciated that the term "emergency anti-torque thruster system" is for basic explanation and understanding of the operation of the anti-torque thruster systems, methods, and apparatuses of this invention. Therefore, the term "emergency anti-torque thruster system" is not to be construed as limiting the anti-torque thruster systems, methods, and apparatuses of this invention.

Figure 1:
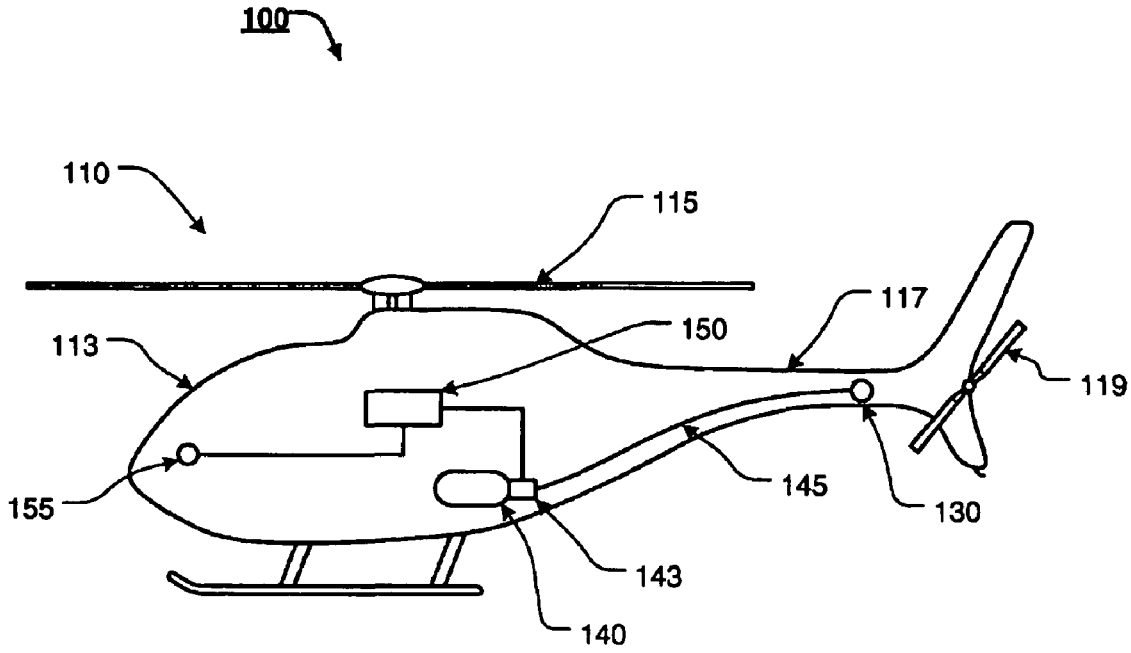
FIG. 1 shows a first functional block diagram of a first exemplary embodiment of an anti-torque thruster system implemented onboard an exemplary helicopter according to this invention.
Figure 2A:
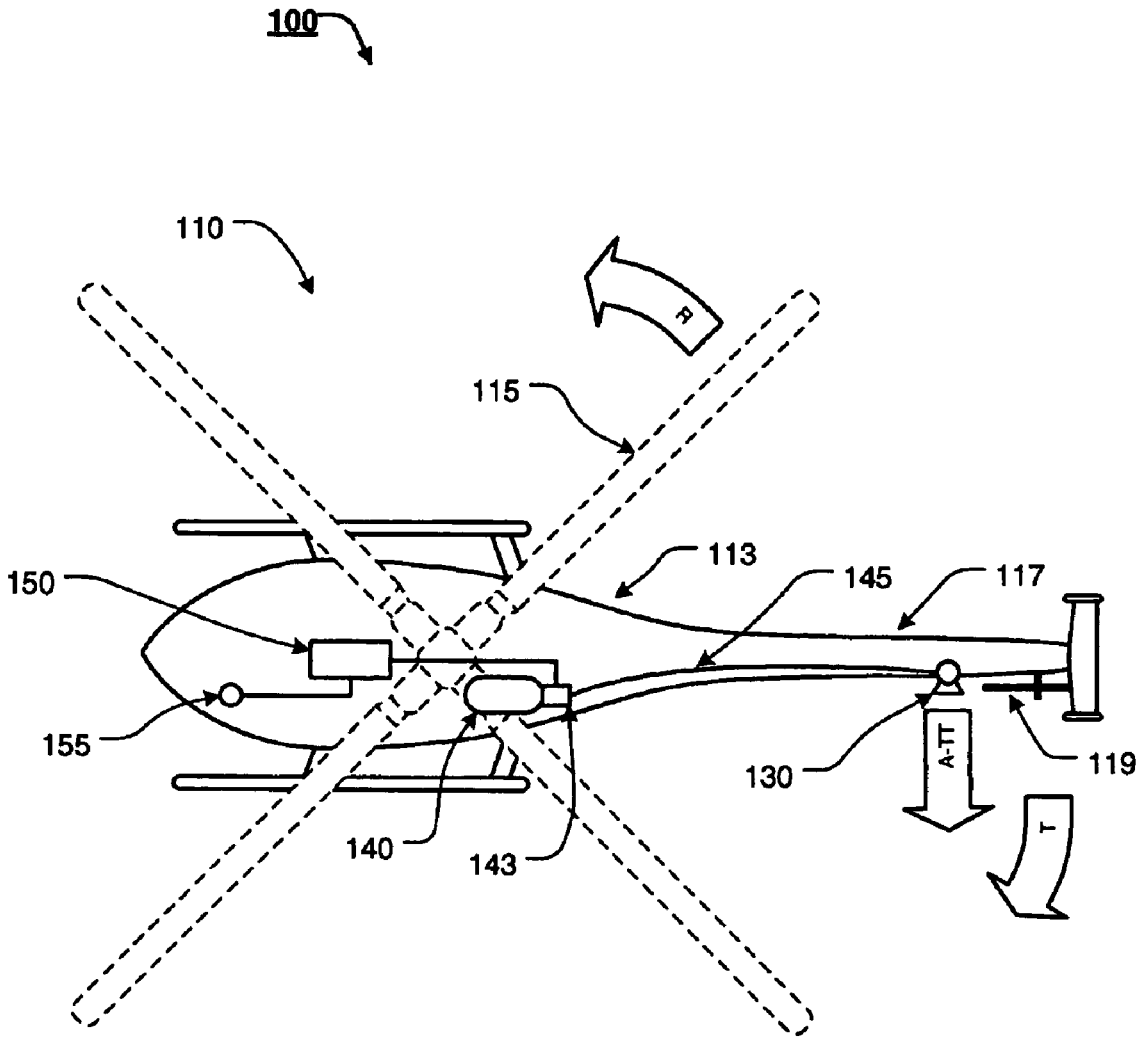
FIG. 2A shows a second functional block diagram of the first exemplary embodiment of an anti-torque thruster system implemented onboard an exemplary helicopter according to this invention.

FIG. 1 shows a first functional block diagram of a first exemplary embodiment of an anti-torque thruster system 100 implemented onboard an exemplary helicopter 110 according to this invention, while FIG. 2A shows a second functional block diagram of the first exemplary embodiment of the anti-torque thruster system 100.

As shown in FIG. 1, the helicopter 110 comprises at least some of a main fuselage 113, a main rotor 115, a tail boom 117, and a tail rotor 119. It should be appreciated that the basic construction and operation of the elements that comprise the helicopter 110 will be understood and apparent to those skilled in the art.

As further shown in FIG. 1, the anti-torque thruster system 100 comprises at least some of a propulsion means 130, a fuel storage container 140, a valve means 145, a controller 150, and a control switch 155.

In various exemplary embodiments, the propulsion means 130 is coupled to the helicopter 110 and is positioned so as to allow the propulsion means 130 to provide a measure of anti-torque thrust, or force, to the helicopter 110 if the tail rotor malfunctions or fails. The propulsion means 130 may be coupled to the helicopter 110 during the initial manufacture of the helicopter 110 or may be coupled to the helicopter 110 as a bolt-on product. The size and power of the propulsion means 130 is a design choice based on the characteristics of the particular helicopter 110 and the amount of torque that may need to be counteracted if the tail rotor malfunctions or fails.

In various exemplary embodiments, the propulsion means 130 may be located proximate an end of the tail boom 117, as illustrated in FIG. 1. In various other exemplary embodiments, the propulsion means 130 may be located in or along the main fuselage 113, in a junction between the main fuselage 113 and the tail boom 117, along the tail boom 117, or proximate an end of the tail boom 117 or the tail rotor 119.

In various other exemplary embodiments, wherein the propulsion means 130 is located proximate an end of the tail boom 117, the propulsion means 130 is located such that the effects of any turbulence from the tail rotor 119 may be minimized.

It should be appreciated that the actual number and placement of the propulsion means 130 used in the anti-torque thruster system 100 is a design choice based on the desired thrust and/or functionality of the propulsion means 130. For example, the propulsion means 130 may comprise a group or bank of multiple propulsion means.

Additionally, the propulsion means 130 may be placed proximate an end of the tail boom 117 for a helicopter that is relatively heavy and would require a relatively substantial amount of anti-torque thrust. Alternatively, the propulsion means 130 may be placed along the main fuselage 113 for a helicopter that is relatively light and would require a comparatively lower amount of anti-torque thrust.

It should be appreciated that, in various exemplary, non-limiting embodiments of this invention, the propulsion means 130 may provide a sufficient amount of anti-torque thrust that the propulsion means 130 is capable of operating in conjunction with the tail rotor 119 to provide the required amount of anti-torque thrust to the helicopter 110. Alternatively, the propulsion means 130 may provide a sufficient amount of anti-torque thrust that the propulsion means 130 is capable of replacing the tail rotor 119, and, alone, provide the required amount of anti-torque thrust to the helicopter 110. In certain exemplary embodiments, the helecopter's primary fuel source could share the same fuel source as the propulsion means 130.

In various exemplary, non-limiting embodiments of this invention, the propulsion means 130 comprises at least one rocket coupled to the body of the helicopter 110. In various exemplary embodiments, the propulsion means 130 comprises at least one hydrogen peroxide ($H_2O_2$) rocket. In these exemplary embodiments, the $H_2O_2$ rocket is powered or fueled by approximately 85% to 98% $H_2O_2$.

The propulsion means 130 is coupled to at least one fuel storage container 140 via a valve means 143 and a fuel delivery conduit 145. Each fuel storage container 140 is formed so as to contain an appropriate amount of fuel for the propulsion means 130.

The capacity and specific contents of each fuel storage container 140 may vary. In various exemplary embodiments, the fuel storage container 140 contains sufficient fuel for the propulsion means 130 to remain active for a sufficient time to allow the helicopter 110 to be safely brought to ground. The fuel storage container 140 may be pressurized or may include a pressurizing means (not shown), such as a fuel pump, which provides pressure or additional pressure to the fuel, such that the fuel may be delivered to the propulsion means 130 under a predetermined or variable pressure or volume.

The valve means 143 is used to regulate the flow of fuel from the fuel storage container 140 to the propulsion means 130. It should be appreciated that the construction of the valve means 143 is a design choice based on the desired fuel volume and flow rate and/or the functionality of the valve means 143.

It should be appreciated that the amount of fuel delivered to the propulsion means 130 as well as the mix of fuel or fuels delivered to the propulsion means 130 may be varied in order to provide varied amounts of thrust from the propulsion means 130. Additionally, further control and trim may be established, for example, by using opposing propulsion means 130 fed through a mixing or separate values for each propulsion means 130 or as a rotating nozzle.

In various exemplary embodiments, the fuel delivery conduit 145 includes a pressurizing means (not shown), such as a fuel pump, which provides pressure or additional pressure to the fuel, such that the fuel may be delivered to the propulsion means 130 under a predetermined or variable pressure or volume.

In various exemplary embodiments, wherein the propulsion means 130 comprises a $H_2O_2$ rocket, the $H_2O_2$ will likely not be stored under pressure, thus the fuel storage container 140 will likely not be required to contain high pressure. However, if the propulsion means 130 comprises a $H_2O_2$ rocket, the portions of the fuel storage container 140, the valve means 143, and the fuel delivery conduit 145 that will come into contact with the $H_2O_2$ fuel must not be formed from an organic or metal material (such as, for example, copper or brass) with which the $H_2O_2$ may have a reaction. In these embodiments, the fuel storage container 140 may be formed from an appropriate material, such as, for example, stainless steel, glass, plastic, or the like.

Therefore, it should be appreciated that the actual material used to form the fuel storage container 140 and the size and characteristics of the fuel storage container 140 used in the anti-torque thruster system 100 is a design choice based on the desired weight, capacity, and/or functionality of the fuel storage container 140.

It should be appreciated that the term "propulsion means" is to be given its broadest meaning and that the particular propulsion means used in the anti-torque thruster system 100 is a design choice based on the desired weight, thrust, activation time, and/or functionality of the propulsion means 130. Therefore, it should be understood that the propulsion means 130 may comprise any type of controllable or actuable rocket or jet propulsion system or other known or later developed propulsion means, regardless of whether the propulsion means utilizes a solid propellant or a liquid-propellant.

It should also be understood that in certain exemplary embodiments, certain of the elements, such as, for example, the fuel storage container 140, the valve means 143, and/or the fuel delivery conduit 145 may not be necessary in the anti-torque thruster system 100. For example, if the propulsion means 130 comprises a solid-propellant rocket or a substantially self-contained solid-propellant or liquid-propellant propulsion means, such as, for example, a Jet-Assisted Take-Off (JATO) type rocket, certain of the elements, such as, for example, the fuel storage container 140, the valve means 143, and/or the fuel delivery conduit 145 may not be necessary in the anti-torque thruster system 100. In these exemplary embodiments, the controller 150 may activate the solid-propellant rocket or a substantially self-contained solid propellant or liquid-propellant propulsion means.

As further shown in FIG. 1, the anti-torque thruster system 100 includes a system control or activation switch 155. The control switch 155 is used to activate the controller 150, which controls the propulsion means 130 by, for example, the valve means 143. In various exemplary embodiments, the control switch 155 is positioned such that it may be accessed and activated or deactivated by a pilot of the helicopter 110.

In certain exemplary embodiments, the control switch 155 may be installed on the cyclic or collective controls such that the anti-torque thruster system 100 may be manually activated upon the pilot's determining tail rotor failure. The control switch 155 may comprise a three-position, spring-loaded rocker switch with a normal "off" (or neutral "off") position that could control the anti-torque thruster system 100 via an up and down or left to right movement of the switch. If opposing propulsion means 130 are included, the opposing propulsion means 130 may each be controlled by manipulation of the switch one way or the other. In certain other exemplary embodiments, the control switch 155 may be coupled to the anti-torque pedals (not shown) of the helicopter 110 such that the control switch 155 may be activated or deactivated by the pilot, via the anti-torque pedals (not shown). In various exemplary embodiments, any manual system may incorporate certain sensors, as described herein, to prevent pilot error.

During operation of the anti-torque thruster system 100, if the pilot of the helicopter 110 senses that the tail rotor 119 has malfunctioned or failed, or that additional or emergency anti-torque thrust should be applied to the helicopter 110, the pilot may activate the control switch 155. When the control switch 155 is activated, the controller 150 controls the valve 143 to release, at a predetermined rate and volume, fuel from the fuel storage container 140. The released fuel flows, via the fuel delivery conduit 145, to the propulsion means 130, which provides a predetermined or variable anti-torque thrust is applied to the helicopter 110.

In various exemplary embodiments, wherein the propulsion means 130 is activated, a predetermined amount of anti-torque thrust is applied to the helicopter 110 by propulsion means 130 until the fuel from the fuel storage container 140 (or from the substantially self-contained solid-propellant or liquid-propellant propulsion means) is depleted. In certain exemplary embodiments, the propulsion means 130 may be activated by the control switch 155 and then deactivated by the control switch 155.

As illustrated in FIG. 2A, the main rotor 115 rotates left, or counter-clockwise, as generally indicated by R. Therefore, if the tail rotor 119 malfunctions or fails, the torque from the main rotor 115 will spin the helicopter 110 right, or clockwise, as generally indicated by T.

The propulsion means 130 is coupled to the tail boom 117 and is positioned so as to allow the propulsion means 130 to provide anti-torque thrust to the helicopter 110 to at least partially counteract the torque from the main rotor 115. The propulsion means 130 provides the anti-torque thrust in a direction generally indicated by A-TT.

Figure 2B:
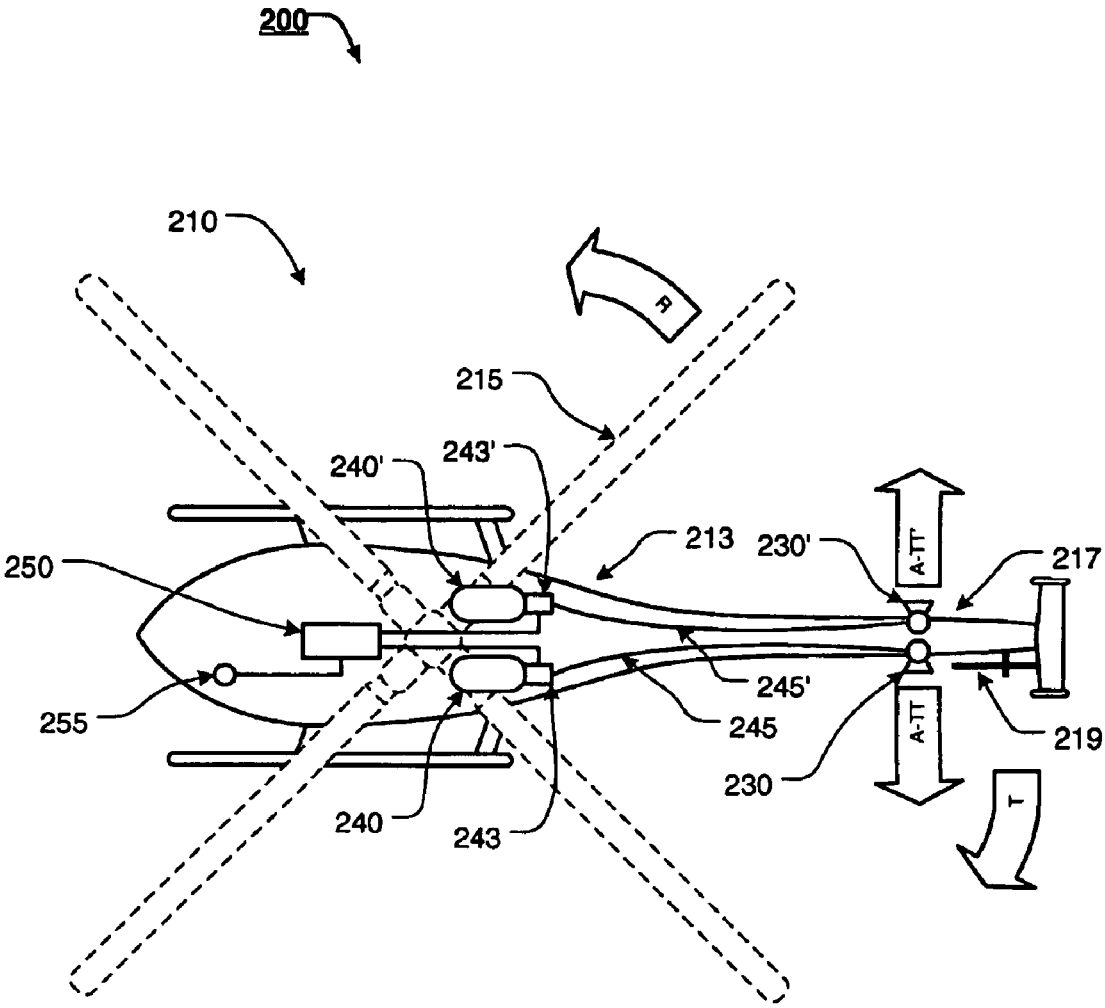
FIG. 2B shows a functional block diagram of an optional exemplary embodiment of an anti-torque thruster system implemented onboard an exemplary helicopter according to this invention.

FIG. 2B shows a functional block diagram of an exemplary embodiment of an anti-torque thruster system 200 implemented onboard an exemplary helicopter 210 according to this invention. As shown in FIG. 2B, the exemplary helicopter 210 comprises at least some of a main fuselage 213, a main rotor 215, a tail boom 217, and a tail rotor 219. The exemplary helicopter 210 includes an anti-torque thruster system 200 comprising at least some of a primary propulsion means 230, a fuel storage container 240, a valve means 245, a controller 250, and a control switch 255.

It should be understood that each of these elements, if included, corresponds to and operates similarly to the main fuselage 113, the main rotor 115, the tail boom 117, the tail rotor 119, the anti-torque thruster system 100, the propulsion means 130, the fuel storage container 140, the valve means 145, the controller 150, and the control switch 155, as described above with reference to FIGS. 1 and 2A.

However, as shown in FIG. 2B, the anti-torque thruster system 200 also includes an optional secondary propulsion means 230', an optional fuel storage container 240', and an optional valve means 245'. The optional valve means 245' is coupled to the controller 250. It should be understood that the primary propulsion means 230 and any optional primary propulsion means 230' may be substantially self-contained, may include certain corresponding separate elements, such as, for example, a controller, a fuel storage container, a valve means, and/or a fuel delivery conduit, or may share one or more controllers, fuel storage containers, valve means, and/or a fuel delivery conduits.

As further illustrated in FIG. 2B, the primary propulsion means 230 is located along a first side of the tail boom 217, while the optional propulsion means 230' is located along a second side of the tail boom 217.

During operation of the anti-torque thruster system 200, the primary propulsion means 230 may be activated to provide anti-torque thrust in a direction generally indicated by A-TT, while the optional propulsion means 230' may separately be activated to provide additive-torque thrust in a direction generally indicated by A-TT'.

While FIG. 2B shows an anti-torque thruster system 200 including a primary propulsion means 230 and an optional propulsion means 230' located along the tail boom 217, it should be appreciated that the primary propulsion means 230 and the optional propulsion means 230' may separately be located in or along the main fuselage 213, in a junction between the main fuselage 213 and the tail boom 217, along the tail boom 217, or proximate an end of the tail boom near the tail rotor, so long as the primary propulsion means 230 may provide some anti-torque thrust and the optional propulsion means 230' may separately provide some additive-torque thrust.

Figure 3:
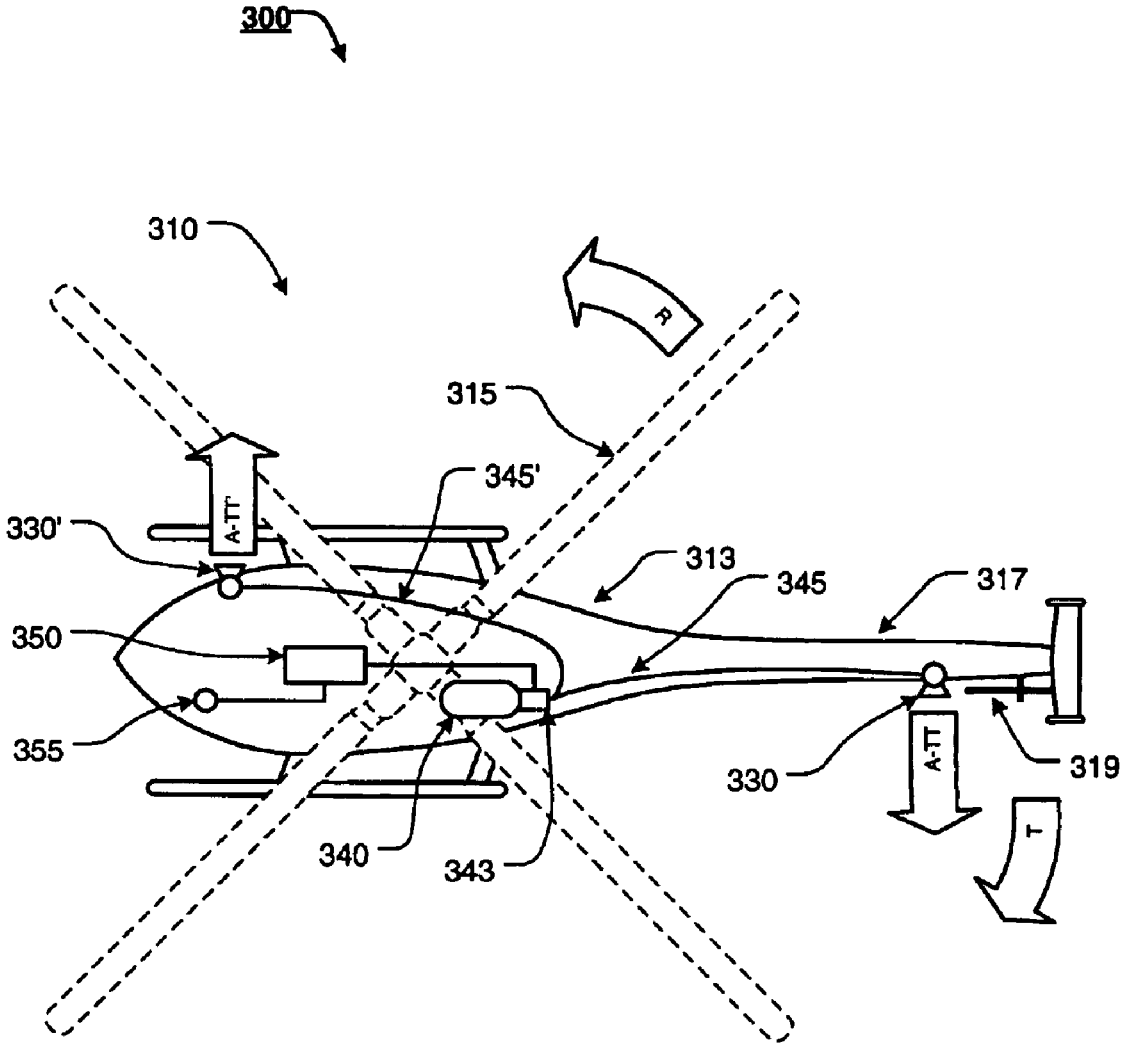
FIG. 3 shows a functional block diagram of a second exemplary embodiment of an anti-torque thruster system implemented onboard an exemplary helicopter according to this invention.

FIG. 3 shows a functional block diagram of an exemplary embodiment of an anti-torque thruster system 300 implemented onboard an exemplary helicopter 310 according to this invention. As shown in FIG. 3, the exemplary helicopter 310 comprises at least some of a main fuselage 313, a main rotor 315, a tail boom 317, and a tail rotor 319. It should also be appreciated that the exemplary helicopter 310 includes an anti-torque thruster system 300 comprising at least some of a propulsion means 330, a fuel storage container 340, a valve means 345, a controller 350, and a control switch 355.

It should be understood that each of these elements, if included, corresponds to and operates similarly to the main fuselage 113, the main rotor 115, the tail boom 117, the tail rotor 119, the anti-torque thruster system 100, the propulsion means 130, the fuel storage container 140, the valve means 145, the controller 150, and the control switch 155, as described above with reference to FIGS. 1, 2A, and 2B.

However, as shown in FIG. 3, the anti-torque thruster system 300 also includes an optional propulsion means 330', an optional fuel storage container 340', and an optional valve means 345'. The optional valve means 345' is coupled to the controller 350. It should be understood that the propulsion means 330 and any optional propulsion means 330' may be substantially self-contained, may include certain corresponding separate elements, such as, for example, a controller, a fuel storage container, a valve means, and/or a fuel delivery conduit, or may share one or more controllers, fuel storage containers, valve means, and/or a fuel delivery conduits.

As further illustrated in FIG. 3, the propulsion means 330 is located along the tail boom 317, while the optional propulsion means 330' is located along the main fuselage 313.

During operation of the anti-torque thruster system 300, if the propulsion means is activated, as described above with respect to FIG. 1, both the propulsion means 330 and the optional propulsion means 330' are activated to provide a predetermined or variable anti-torque thrust to the helicopter 310. The propulsion means 330 provides anti-torque thrust in a direction generally indicated by A-TT, while the optional propulsion means 330' provides anti-torque thrust in a direction generally indicated by A-TT'.

While FIG. 3 shows an anti-torque thruster system 300 including a propulsion means 330 located along the tail boom 317 and an optional propulsion means 330' located along the main fuselage 313, it should be appreciated that the propulsion means 330 may include additional propulsion means 330. Each of the propulsion means 330 may be located in or along the main fuselage 313, in a junction between the main fuselage 313 and the tail boom 317, along the tail boom 317, or proximate an end of the tail boom near the tail rotor.

In various exemplary embodiments, certain of the multiple propulsion means 330 may serve as primary propulsion means 330, while other of the multiple propulsion means 330 may serve as secondary propulsion means 330. It should be understood that in these various embodiments each of the multiple propulsion means 330 corresponds to and operates similarly to the propulsion means 330, as described above. However, each of the multiple propulsion means 330 may be substantially self-contained, may include certain corresponding separate elements, such as, for example, a controller, a fuel storage container, a valve means, and/or a fuel delivery conduit, or may share one or more controllers, fuel storage containers, valve means, and/or a fuel delivery conduits.

Figure 4:
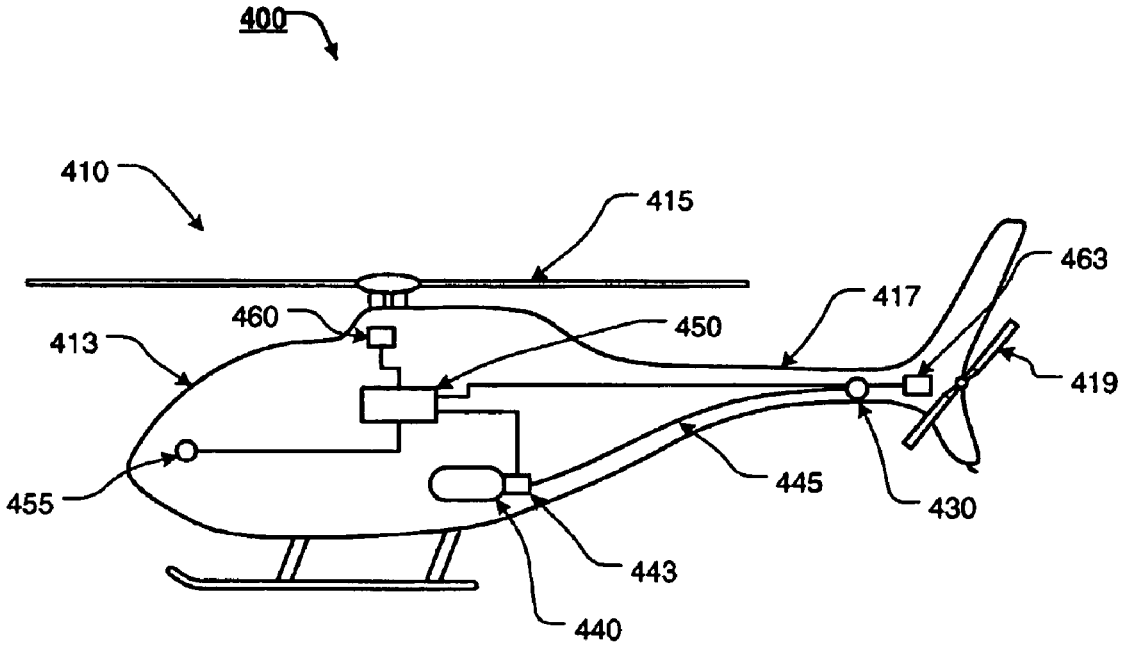
FIG. 4 shows a functional block diagram of a third exemplary embodiment of an anti-torque thruster system implemented onboard an exemplary helicopter according to this invention.

FIG. 4 shows a functional block diagram of a third exemplary embodiment of an anti-torque thruster system 400 implemented onboard an exemplary helicopter 410 according to this invention. As shown in FIG. 4, the exemplary helicopter 410 comprises at least some of a main fuselage 413, a main rotor 415, a tail boom 417, and a tail rotor 419. It should also be appreciated that the exemplary helicopter 410 includes an anti-torque thruster system 400 comprising at least some of a propulsion means 430, a fuel storage container 440, a valve means 445, and a controller 450. The exemplary helicopter 410 may also optionally include control switch 455 (not shown).

It should be understood that each of these elements, if included, corresponds to and operates similarly to the main fuselage 113, the main rotor 115, the tail boom 117, the tail rotor 119, the anti-torque thruster system 100, the propulsion means 130, the fuel storage container 140, the valve means 145, the controller 150, and the control switch 155, as described above with reference to FIGS. 1, 2A, and 2B.

It should also be understood that the anti-torque thruster system 400 may also include any of the optional propulsion means 330', the optional fuel storage container 340', or the optional valve means 345', as described above, with respect to FIG. 3.

However, as shown in FIG. 4, the anti-torque thruster system 400 also comprises at least one of a main rotor sensor 460 and a tail rotor sensor 463. The tail rotor sensor 463 monitors the tail rotor 419 in order to monitor the function of the tail rotor 419. In various exemplary embodiments, the main rotor sensor 460 monitors the main rotor 415 such that information regarding the function of the tail rotor 419 may be compared to information regarding the function of the main rotor 415 in order to detect any malfunction or failure in the tail rotor 419.

In various exemplary embodiments, the tail rotor sensor 463 comprises a strobe and a tachometer coupled proximate the tail rotor 419 to pick up readings from the tail rotor 419. The sensors and systems for monitoring, sensing, and measuring the main rotor 415 and/or malfunction or failure in the tail rotor 419 may comprise any known or later developed sensors, systems, or technologies.

In various exemplary embodiments, at least one of the sensors may comprise an anti-vibratory sensor. The anti-vibratory sensor or sensors, either alone or in combination, are capable of detecting certain vibrations of the main rotor 415, and/or the tail rotor 419, and/or the tail rotor drive train (not shown), and/or any other component of the tail rotor system. The detected vibrations may signal the failure or pending failure of the main rotor 415, the tail rotor 419, the tail rotor drive train, or any other component of the tail rotor system.

During operation of the anti-torque thruster system 400, if a malfunction or failure is detected in the tail rotor 419, the propulsion means 430 (and optionally the propulsion means 330', if included) is activated, as described above.

Figure 5:
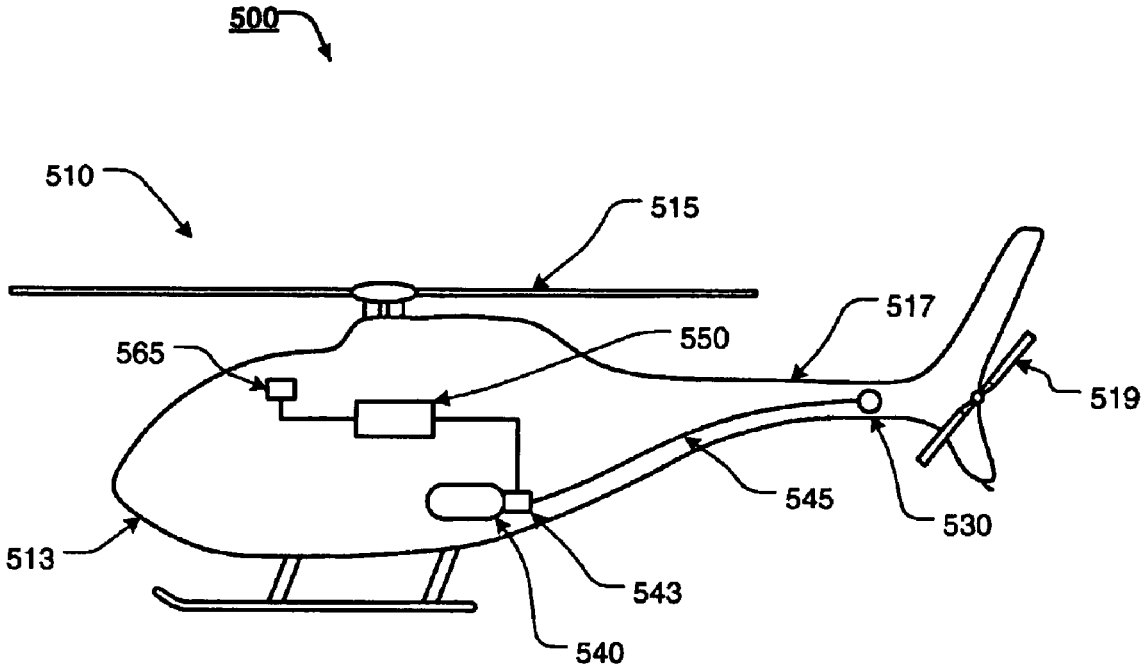
FIG. 5 shows a functional block diagram of a fourth exemplary embodiment of an anti-torque thruster system implemented onboard an exemplary helicopter according to this invention.

FIG. 5 shows a functional block diagram of a fourth exemplary embodiment of an anti-torque thruster system 500 implemented onboard an exemplary helicopter 510 according to this invention. As shown in FIG. 5, the exemplary helicopter 510 comprises at least some of a main fuselage 513, a main rotor 515, a tail boom 517, and a tail rotor 519. It should also be appreciated that the exemplary helicopter 510 includes an anti-torque thruster system 500 comprising at least some of a propulsion means 530, a fuel storage container 540, a valve means 545, and a controller 550.

The exemplary helicopter 510 may also optionally include at least some of a control switch 555 (not shown) and/or any of the optional propulsion means 530' (not shown), the optional fuel storage container 540' (not shown), or the optional valve means 545' (not shown), a main rotor sensor 560 (not shown), or a tail rotor sensor 563 (not shown).

It should be understood that each of these elements, if included, corresponds to and operates similarly to the main fuselage 113, the main rotor 115, the tail boom 117, the tail rotor 119, the anti-torque thruster system 100, the propulsion means 130, the fuel storage container 140, the valve means 145, the controller 150, the control switch 155, the optional propulsion means 330', the optional fuel storage container 340', the optional valve means 345', the main rotor sensor 460, and the tail rotor sensor 463, as described above with reference to FIGS. 1-4.

However, as shown in FIG. 5, the anti-torque thruster system 500 also comprises at least one of a spin sensor 565. The spin sensor 565 monitors the rate of spin for rotation of the helicopter 510. In various exemplary embodiments, the spin sensor 565 comprises a gyroscope. Appropriate sensors and systems for monitoring, sensing, and measuring the rate of spin or rotation of the helicopter 510 are well known in the art.

The spin sensor 565 may detect and/or provide information regarding any out of control, or major yawl, based upon the normal torque direction of the helicopter. If the spin sensor 565 detects instability in the torque direction, or high G forces, which would relate to a malfunction or failure of the tail rotor 519, the propulsion means 530 (and any optional propulsion means 530', if included) is activated, as described above.

It should be appreciated that in various exemplary embodiments, information from the spin sensor 565 together with any information from any main rotor sensor 560 (not shown) and/or any tail rotor sensor 563 (not shown) may be transmitted to the controller 550 such that a determination may be made regarding any malfunction or failure of the tail rotor 519.

In various exemplary embodiments, the propulsion means 530 (and any optional propulsion means 530', if included) may be activated until the spin sensor 565 no longer detects the instability in the torque direction or the high G forces.

Figure 6:
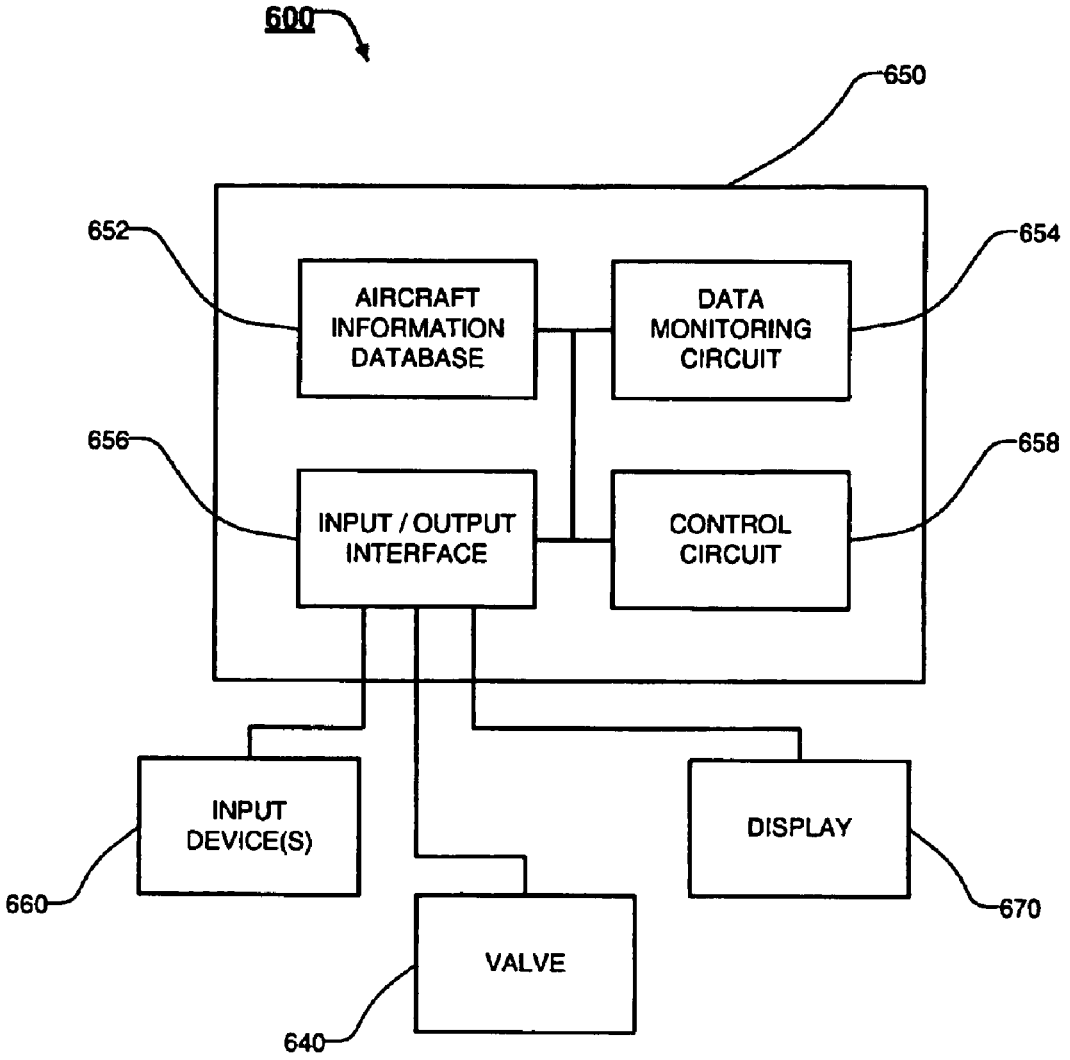
FIG. 6 is a functional block diagram outlining an exemplary embodiment of controller for use in an anti-torque thruster system according to this invention.

FIG. 6 shows a functional block diagram outlining an exemplary embodiment of a possible controller for use in an anti-torque thruster system(s) according to this invention. As shown in FIG. 6, one exemplary embodiment of a controller 600 includes a computer or central processing unit (CPU) 650, one or more input devices 660, a display 670, and a valve or valve control 640.

The computer or CPU 650 includes at least some of a aircraft information database 652, a data monitoring circuit 654, an input/output interface 656, and a control circuit 658. The computer or CPU 650 interfaces with the one or more input devices 660, the display 670, and the valve or valve control 640 through the input/output interface 656.

The helicopter information database 652 at least stores some data specific to the particular helicopter on which the controller 600 is operating. In various exemplary embodiments, the helicopter specific information includes data about the helicopter's main rotor torque and performance, tail rotor torque and performance, torque parameters, engine type, aerodynamics, structural limitations, mechanical limitations, performance limitations, safety limitations, or the like.

The data monitoring circuit 654 monitors data from the one or more input devices 660.

The control circuit 658 manages reading data from and writing data to the aircraft information database 652. The control circuit 658 drives the transmission of data to and the reception of data from the one or more input devices 660 and the display 670, through the input/output interface 656. The control circuit 658 controls operation of the valve or valve control 640, through the input/output interface 656.

In various exemplary embodiments, the valve or valve control 640 can be a the valve or valve, such as, for example, valve 143, 343, 443, or 543).

In various exemplary embodiments, the one or more input devices 660 can be one or more of a switch (such as, for example, control switch 155, 355, 455, or 555), a knob, a button, a main rotor sensor (such as, for example, main rotor sensor 460 or 560), a tail rotor sensor (such as, for example, tail rotor sensor 463 or 563), a spin sensor (such as, for example, spin sensor 565), or any other known or later developed device capable of providing flight information.

In various exemplary embodiments, the display 670 can be a cathode ray tube display, a liquid crystal display, a plasma display, a light emitting diode (LED) display, or any other known or later developed system capable of displaying data to the pilot to indicate the status of the anti-torque thruster system(s) or the controller 600.

In the various exemplary embodiments described herein, the computer or CPU 650 interfaces, for example, with the one or more input devices 660, the display 670, and/or the valve or valve control 640, through the linked connection using the input/output interface 656. Alternatively, the computer or CPU 650 can interface with the one or more input devices 660, the display 670, and/or the valve or valve control 640, through a direct wired connection. The linked connection can be any known or later developed device or system for connecting the computer or CPU 650 to the one or more input devices 660, the display 670, and/or the valve or valve control 640, including a wireless link, a very high frequency (VHF) connection, an ultra high frequency (UHF) connection, a radio frequency (RF) connection, a satellite connection, or the like. In general, the linked connection can be any known or later developed connection system or structure usable to connect the computer or CPU 650 to the one or more input devices 660, the display 670, and/or the valve or valve control 64090, including both wired and/or wireless connections.

In various exemplary embodiments, the controller 600 will be included as part of the software executing on the computer or CPU. It should be appreciated that any other known or later developed system capable of processing and outputting data could be used in place of the computer or CPU.

During operation of one exemplary embodiment of the controller 600, the input/output interface 656 receives helicopter specific information from the helicopter information database 652 and flight information from the one or more input devices 660. As the controller 600 receives the flight information, the controller 600 sends the flight information and comparable helicopter specific information to the data monitoring circuit 654.

When the data monitoring circuit 654 receives the comparable flight information and helicopter specific information, the data monitoring circuit 654 compares the information to determine whether, for example, the tail rotor is malfunctioning or the helicopter is spinning outside a predetermined parameter. If the data monitoring circuit 654 determines that the, for example, the tail rotor is malfunctioning or the helicopter is spinning outside a predetermined parameter, the controller 600 controls the valve or valve control 640 to activate the propulsion means, as described above.

During operation of a second or coexisting exemplary embodiment of the controller 600, when the data monitoring circuit 654 detects a signal from the one or more input devices 660, wherein the one or more input devices 660 is, for example, a switch, the controller 600 controls the valve or valve control 640 to activate the propulsion means, as described above.

In various exemplary monuments, when the data monitoring circuit 654 detects a signal from the one or more input devices 660 or the propulsion means is activated, a signal is transmitted to the display 670.

Figure 7:
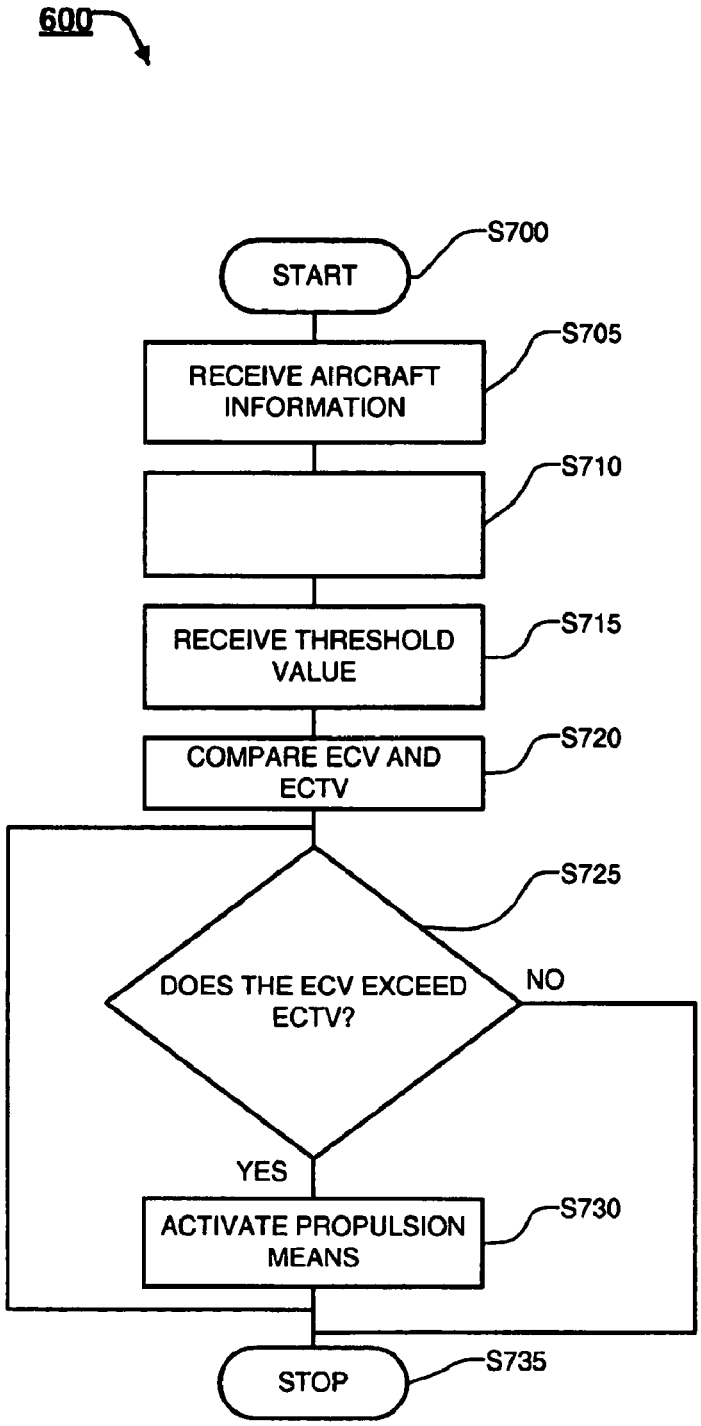
FIG. 7 is a flowchart outlining one exemplary embodiment of a method for using an anti-torque thruster system according to this invention.

FIG. 7 is a flowchart outlining one exemplary embodiment of a method for using an anti-torque thruster system according to this invention.

As shown in FIG. 7, beginning in step S700, control continues to step S705 where certain flight information is received. In various exemplary embodiments, the flight information includes at least some information and/or data regarding the functionality of the tail rotor, the main rotor, and/or the rotation of the helicopter.

Then, in step S710, certain helicopter specific information is received. In various exemplary embodiments, the helicopter specific information includes at least some information and/or data about the helicopter's main rotor torque and performance, tail rotor torque and performance, torque parameters, engine type, aerodynamics, structural limitations, mechanical limitations, performance limitations, acceptable rotation parameters, safety limitations, or the like.

Next, in step S715, the received flight information is compared with the received helicopter specific information. Control then continues to step S720.

In step S715, a determination is made whether any of the received flight information regarding the functionality of the tail rotor, the main rotor, and/or the rotation of the helicopter exceeds any of the parameters of the received helicopter specific information. If, in step S715, it is determined that certain of the received flight information exceeds the parameters of the received helicopter specific information, control advances to step S725.

In step S725, the propulsion means is activated to produce an anti-rotation thrust. Control then returns to step S705.

If, in step S715, it is determined that certain of the received flight information does not exceed any of the parameters of the received helicopter specific information, control advances to step S730 where the method ends.

It should be understood that the method for using an anti-torque thruster system described above may be implemented such that the method restarts either at predetermined time intervals, at the request of a pilot, when the flight information is updated, or when certain predetermined helicopter specific information changes.

It should be appreciated that, for simplicity and clarification, the embodiments of this invention are shown and/or described with reference to the anti-torque thruster system having one or two separate propulsion means. However, the illustration of an anti-torque thruster system comprising one or two propulsion means is intended to be illustrative, not limiting. Thus, it should be understood that the number of propulsion means of the anti-torque thruster system may be varied and be more or less than two.

While this invention has been described in conjunction with the exemplary embodiments outlined above, it is evident that many alternatives, modifications, and variations will be apparent to those skilled in the art. For example, the anti-torque thruster system of this invention may be coupled to the wings or fuselage of a fixed-wing, multi-engine aircraft. In this manner, the anti-torque thruster system could counteract the torque created if one of the engines fails. Such adaptations and modifications should and are intended to be comprehended within the meaning and range of equivalents of the disclosed exemplary embodiments. It is to be understood that the phraseology of terminology employed herein is for the purpose of description and not of limitation. Accordingly, the foregoing description of the exemplary embodiments of the invention, as set forth above, are intended to be illustrative, not limiting. Various changes, modifications, and/or adaptations may be made without departing from the spirit and scope of this invention.

What is claimed is:

1. An anti-torque thruster system implemented onboard a helicopter comprising:

a propulsion means coupled to the helicopter, wherein the propulsion means is capable of providing a measure of anti-torque thrust to the helicopter, and wherein the propulsion means is in addition to and of a different type from the helicopter's main anti-torque system;

a fuel storage container coupled to the propulsion means via a fuel delivery conduit, wherein the fuel storage container is capable of storing an appropriate fuel for the propulsion means;

a valve means disposed between the fuel storage container and the propulsion means, wherein the valve means may be useable to regulate the flow of fuel from the fuel storage container to the propulsion means; and a controller for controlling the valve means to regulate the flow of fuel from the fuel storage container to the propulsion means, wherein the controller is capable of receiving input from at least one input device.

2. The anti-torque thruster system of claim 1, wherein the propulsion means includes a primary propulsion means and a secondary propulsion means.

3. The anti-torque thruster system of claim 2, wherein the primary propulsion means is capable of providing at least some anti-torque thrust and the secondary propulsion means is capable of providing at least some additional anti-torque thrust.

4. The anti-torque thruster system of claim 1, wherein the propulsion means is coupled to the helicopter during the initial manufacture of the helicopter.

5. The anti-torque thruster system of claim 1, wherein the propulsion means is coupled to the helicopter as a bolt-on product.

6. The anti-torque thruster system of claim 1, wherein the propulsion means is located along a main fuselage.

7. The anti-torque thruster system of claim 1, wherein the propulsion means is located along a junction between a main fuselage and a tail boom.

8. The anti-torque thruster system of claim 1, wherein the propulsion means is connected to a tail boom of the helicopter.

9. The anti-torque thruster system of claim 1, wherein the propulsion means comprises at least one rocket.

10. The anti-torque thruster system of claim 1, wherein the propulsion means utilizes a liquid-propellant.

11. The anti-torque thruster system of claim 1, wherein the propulsion means comprises at least one hydrogen peroxide fueled rocket.

12. The anti-torque thruster system of claim 11, wherein the rocket is fueled by approximately 85% to 98% hydrogen peroxide.

13. The anti-torque thruster system of claim 1, wherein fuel storage container includes a pressurizing means.

14. The anti-torque thruster system of claim 1, wherein the fuel delivery conduit includes a pressurizing means.

[15. The anti-torque thruster system of claim 1, wherein the propulsion means utilizes a solid propellant.]

[16. The anti-torque thruster system of claim 1, wherein the propulsion means includes a rotatable nozzle.]

17. The anti-torque thruster system of claim 1, wherein the controller is coupled to at least one control switch, wherein the at least one control switch is capable of providing a receivable input to the controller to activate the controller.

18. The anti-torque thruster system of claim 17, wherein the control switch is coupled to at least one anti-torque pedal of the helicopter.

19. The anti-torque thruster system of claim 1, wherein the controller is coupled to at least one sensor, wherein the at least one sensor is capable of providing a receivable input to the controller.

20. The anti-torque thruster system of claim 19, wherein the at least one sensor comprises at least one of a tail rotor sensor, a main rotor sensor, an anti-vibratory sensor, a spin sensor, a strobe, a tachometer, and/or a gyroscope.

21. An anti-torque thruster system implemented onboard a helicopter comprising:

at least one propulsion means coupled to the helicopter, wherein each propulsion means is capable of providing a measure of anti-torque thrust to the helicopter, and wherein the propulsion means is in addition to and of a different type from the helicopter's main anti-torque system;

at least one fuel storage container coupled to at least one propulsion means via at least one fuel delivery conduit, wherein each fuel storage container is capable of storing an appropriate fuel for the at least one propulsion means;

at least one valve means disposed between each fuel storage container and each propulsion means, wherein each valve means may be useable to regulate the flow of fuel from the fuel storage container to the coupled propulsion means; and at least one controller for controlling each valve means to regulate the flow of fuel from each fuel storage container to the coupled propulsion means, wherein the controller is capable of receiving input from at least one input device.

22. A method for using an anti-torque thruster system onboard a helicopter, comprising:

providing at least one propulsion means coupled to the helicopter, wherein each propulsion means is capable of providing a measure of anti-torque thrust to the helicopter, and wherein each propulsion means is in addition to and of a different type from the helicopter's main anti-torque system;

providing at least one fuel storage container coupled to at least one propulsion means via at least one fuel delivery conduit, wherein each fuel storage container is capable of storing an appropriate fuel for the at least one propulsion means;

providing at least one valve means disposed between each fuel storage container and each propulsion means, wherein each valve means may be useable to regulate the flow of fuel from the fuel storage container to the coupled propulsion means;

providing at least one controller for controlling each valve means to regulate the flow of fuel from each fuel storage container to the coupled propulsion means, wherein the controller is capable of receiving input from at least one input device;

receiving certain flight information;

receiving certain helicopter specific information;

comparing the received flight information with the received helicopter specific information to determine whether any of the received flight information exceeds any parameters of the received helicopter specific information;

activating, if the compared flight information exceeds the parameters of the received helicopter specific information, the propulsion means to provide at least a measure of anti-torque thrust to the helicopter.

23. The method of claim 22, wherein the flight information comprises at least some data regarding at least one of the functionality of a tail rotor, a main rotor, rotation of the helicopter, and/or pilot input.

24. The method of claim 22, wherein the helicopter specific information comprises at least some data regarding at least one of a helicopter's main rotor torque and performance, tail rotor torque and performance, torque parameters, engine type, aerodynamics, structural limitations, mechanical limitations, performance limitations, acceptable rotation parameters, safety limitations, and/or an equivalent.

*25. The anti-torque thruster system of claim 1, wherein the propulsion means includes a rotatable nozzle and further comprising a rotational controller for controlling the rotation of the nozzle such that the direction of thrust may be controlled.*

*26. The anti-torque thruster system of claim 1, wherein the propulsion means is rotatable and further comprising a rotational controller for controlling the rotation of the propulsion means such that the direction of thrust may be controlled.*

*27. A method for using an anti-torque thruster system onboard a helicopter, comprising:*

*providing at least one propulsion means which utilizes a solid propellant coupled to the helicopter, wherein each propulsion means is capable of providing a measure of anti-torque thrust to the helicopter, and wherein each propulsion means is in addition to and of a different type from the helicopter's main anti-torque system;*

*providing at least one ignition system coupled to the propulsion means, wherein the ignition system is capable of igniting the solid propellant;*

*providing at least one controller for controlling the propulsion means, wherein the controller is capable of receiving input from at least one input device;*

*receiving certain flight information;*

*receiving certain helicopter specific information;*

*comparing the received flight information with the received helicopter specific information to determine whether any of the received flight information exceeds any parameters of the received helicopter specific information;*

*activating, if the compared flight information exceeds the parameters of the received helicopter specific information, the propulsion means to provide at least a measure of anti-torque thrust to the helicopter.*

*28. The method of claim 27, wherein the flight information comprises at least some data regarding at least one of the functionality of a tail rotor, a main rotor, rotation of the helicopter, and/or pilot input.*

*29. The method of claim 27, wherein the helicopter specific information comprises at least some data regarding at least one of a helicopter's main rotor torque and performance, tail rotor torque and performance, torque parameters, engine type, aerodynamics, structural limitations, mechanical limitations, performance limitations, acceptable rotation parameters, safety limitations, and/or an equivalent.*

* * * * *